Nov. 8, 1955    L. R. NELSON    2,723,159
LAWN SPRINKLERS

Filed Dec. 6, 1950    2 Sheets-Sheet 1

Inventor
L. R. Nelson

By
L. M. Thurlow

ATTORNEY

Nov. 8, 1955
L. R. NELSON
2,723,159
LAWN SPRINKLERS
Filed Dec. 6, 1950
2 Sheets-Sheet 2
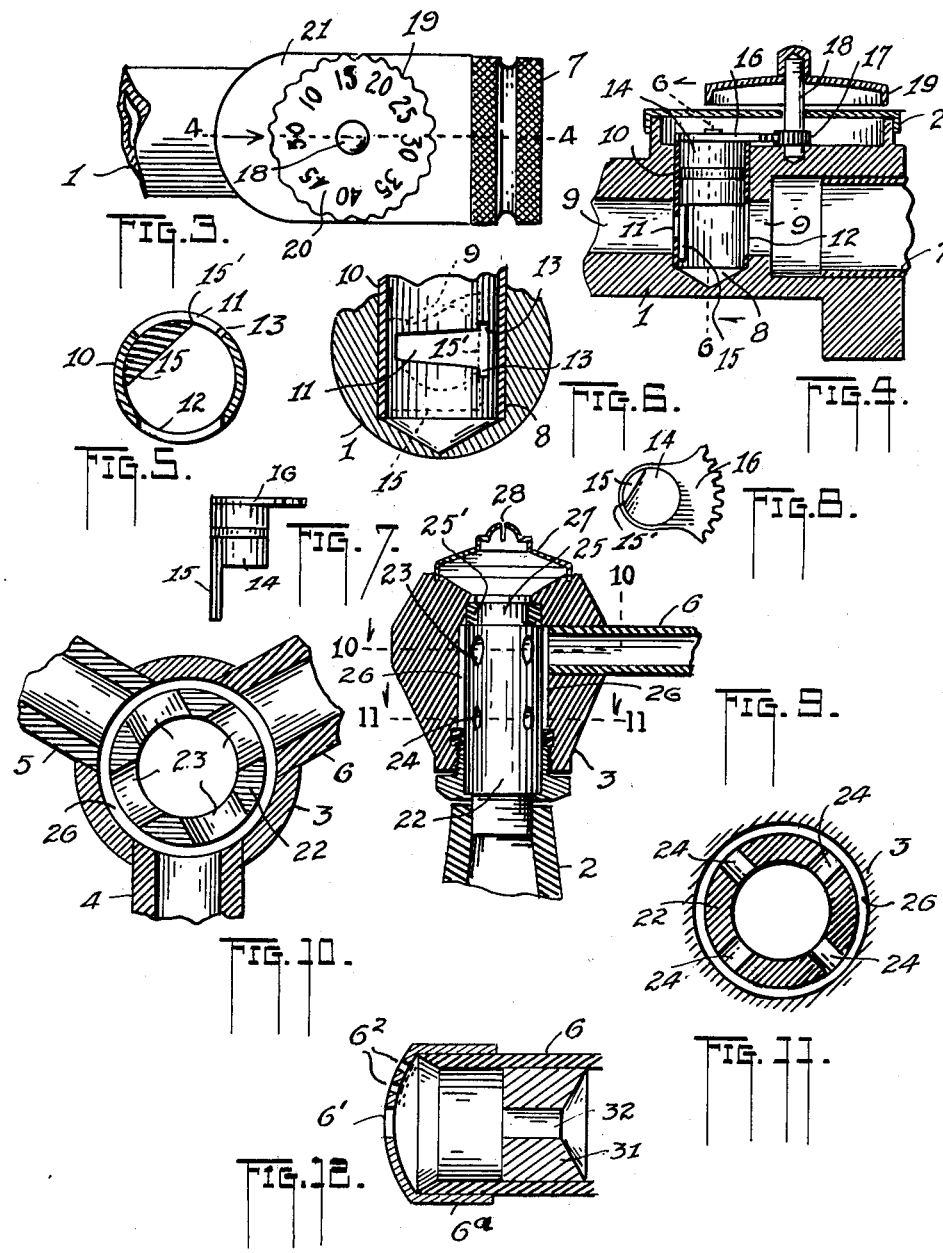
Inventor
L.R.Nelson,
By L. M. Thurlow
ATTORNEY

United States Patent Office 2,723,159
Patented Nov. 8, 1955

2,723,159

LAWN SPRINKLERS

Lewen R. Nelson, Peoria, Ill.

Application December 6, 1950, Serial No. 199,514

9 Claims. (Cl. 299—69)

This invention relates to improvements in lawn sprinklers, particularly of the whirling-arm type.

More particularly, the invention relates to an improved reaction type rotary lawn sprinkler wherein the extent of the ground area to be sprinkled may be predetermined by a simple manual adjustment, the construction of the device being such that any area selected by such adjustment will be uniformly sprinkled over its entire extent. In other words, the sprinkler of this invention allows the operator to chose by adjustment the particular ground area to be watered, and also includes means for automatically assuring an even distribution of water over such area without requiring further attention or manipulation of the device on the part of the operator.

In accordance with one preferred embodiment of the invention, the advantages above referred to are provided in a sprinkler adapted to water a polygonal area. The invention is further characterized by provision, in a sprinkler of the adjustable type referred to, of tubular sprinkler arms terminating in very simple and inexpensive discharge nozzles, one or more of the arms being equipped with fixed flow-controlling plugs situated within the arm or arms and cooperating with the nozzles to provide automatic concentration of the spray from such arm or arms over a given portion of the total ground area to be sprinkled, so that the combined discharge from all of the arms will uniformly cover whatever area has been selected by the operator.

Other objects and advantages will appear during the description of the structure of the invention.

That the invention may be fully understood, the accompanying drawings are provided forming parts hereof.

In said drawings, Fig. 1 is an elevation of my improved sprinkler. Fig. 2 is a plan of the same. Fig. 2$^a$, 2$^b$ and 2$^c$ are plans of the faces of certain nozzles as parts of certain arms shown in Figs. 1 and 2. Figs. 2$^d$ and 2$^e$ are longitudinal sections of parts of two of the arms shown in Figs. 1 and 2. Fig. 3 is a plan, much enlarged, of parts shown in Fig. 2. Fig. 4 is a sectional elevation of Fig. 3 produced on line 4—4 thereof.

Fig. 5 is a much enlarged transverse section of parts shown in Fig. 4. Fig. 6 is a transverse section, in elevation, of a valve structure produced on line 6—6 of Fig. 4, but much enlarged.

Fig. 7 is an elevation of a valve portion as shown in Fig. 4.

Fig. 8 illustrates a valve of Fig. 7 as viewed at its under side.

Fig. 9 is a section, in elevation, and much enlarged, of a head portion of the sprinkler shown in Figs. 1 and 2.

Fig. 10 is a transverse section of Fig. 9 produced on line 10—10 thereof.

Fig. 11 is likewise a transverse section of Fig. 9 on line 11—11 thereof, and Fig. 12 is a much enlarged longitudinal section of a nozzle arrangement shown in Fig. 2$^e$.

Figure 1:
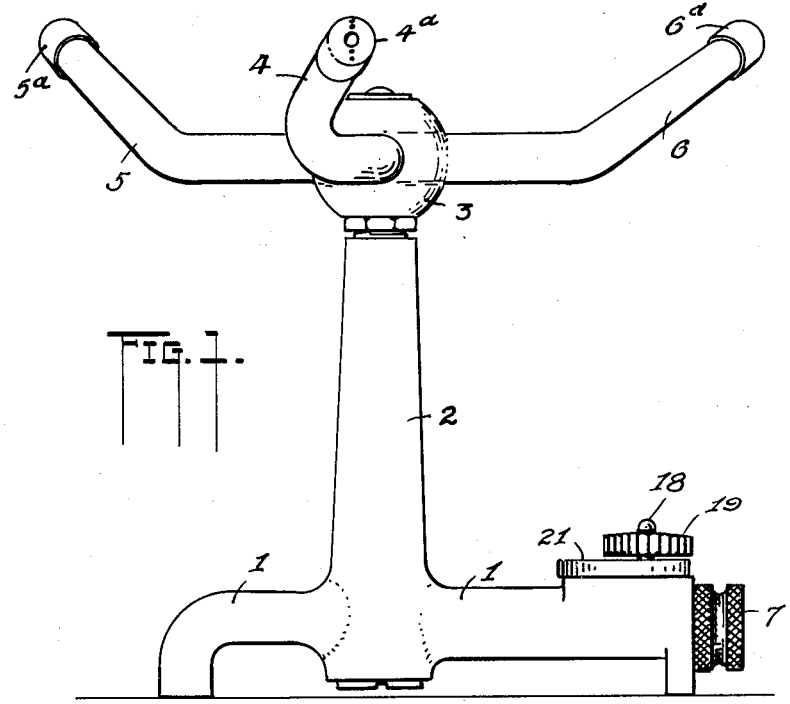
Figure 2:
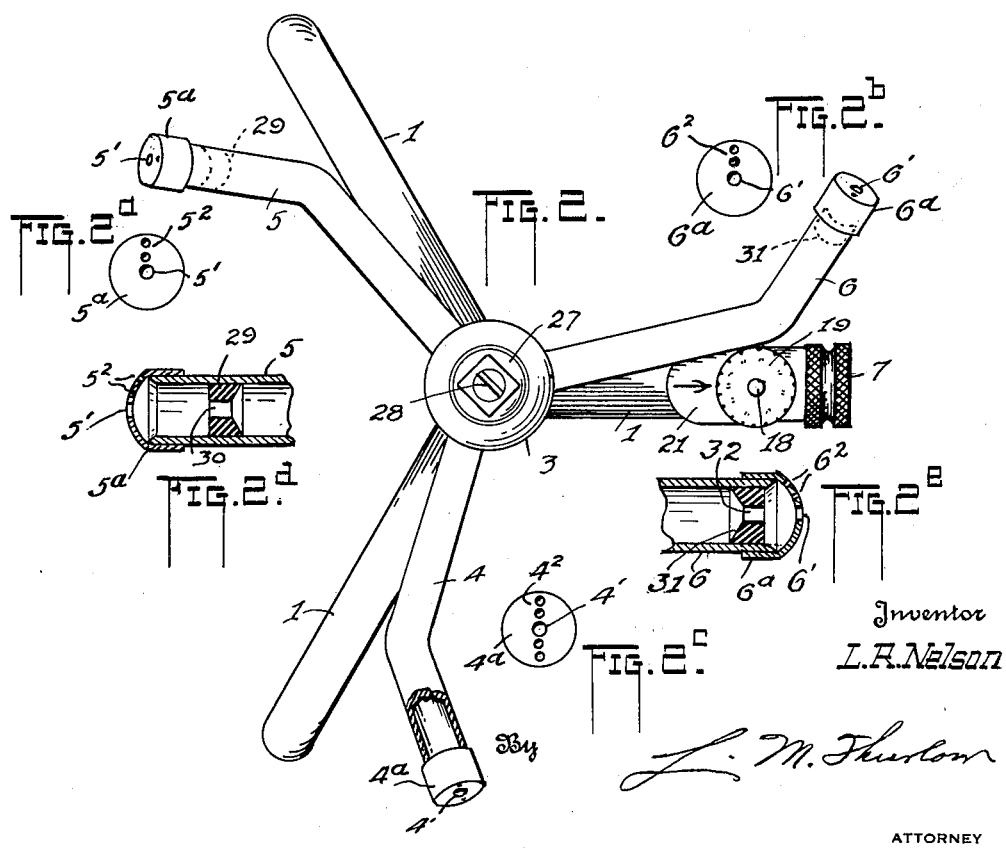

As shown in Figs. 1 and 2, the sprinkler comprises, in general a base portion consisting of the legs 1 from which arises a standard 2 which supports thereon a rotatable member 3 having arms 4, 5 and 6 for water distribution, the said standard, and one of said legs serving to convey water toward said arms, one of the legs for the latter purpose, as shown in Fig. 4, being provided with any usual coupling portion 7 for receiving a hose, not shown.

Inward from its extremity the leg last mentioned is provided with a bore 8 whose axis lies at right angles to the bore 9 thereof, said bore 8 receiving in a snug fit a shell 10 having an opening or port 11 in its wall in line with the said bore 9. Also the shell has an opening 12 lying opposite the opening 11 to communicate with the latter bore. Said opening 11 is shown as long and narrow in one direction of its measurement while being greater width at one extremity than at the other, the longest measurement of said opening or port lying at right angles to the axis of the bore of said shell. Also, at the widest measurement of the said opening the shell is provided with recesses 13 opposed one to the other. That portion of said shell having the opening or port 11 constitutes, it may be said, a diaphragm separating the named bore 9 into two separate chambers or compartments, one at each side of the named port. Seated in a snug turning fit within the shell 10 is a valve which includes a cylindrical portion 14, Figures 7 and 8, from which depends a tongue 15, Figures 5 and 7, adapted to overlie the opening or port 11 and which may expose more or less of the same. The valve also includes an arm 16 having gear teeth to engage the teeth of a pinion 17 affixed to a shaft 18 to which, in turn, is secured a dial 19 provided with numerals 20, Fig. 3, indicating certain ground measurements or areas as will appear later herein, said shaft being supported in a cover portion 21, for example.

In Fig. 9 it will be observed that the standard 2 supports what may be termed a sprinkler-head which comprises a tubular member 22 suitably secured within the bore of said standard, it being noted, in the present instance, that said member 22 has four openings or ports 23 in its wall near the upper extremity thereof, all lying in the same plane and equally spaced from each other. Also, that spaced below said ports 23 the member has a number of openings or ports 24 but each of less diameter than any one of the said ports 23. Preferably the upper extremity of the member 22 is reduced in diameter as at 25 encircling which is a bushing 25'. In Fig. 9 the member 3 carrying the arms 4, 5 and 6 encloses the member 22 together with the bushing 25', while resting upon the latter. Said member 3 has a bore greater in diameter than the member 22, as shown, and thereby a space 26 is created in such position and of such an extent that all of the openings or ports 23, 24 may communicate therewith. At its lower extremity the member 3 receives the well known packing-nut arrangement for preventing leakage of water from the space 26. Surmounting the member 3 is a shell portion 27 having a narrow slit 28 therein for the issue therethrough of a fan-shaped water jet.

The sprinkler arms 4, 5 and 6, as suggested in Fig. 10, all communicate, as to their bores, with the annular space 26 and the bore-axes may coincide with the axes of the openings or ports 23 of the member 22, the diameters of the bores and the ports 23 being, by choice, substantially equal in measurement.

The extremities of the sprinkler arms 4, 5, 6, are each provided with a nozzle 4$^a$, 5$^a$, and 6$^a$, respectively, it being noted in Fig. 2$^c$ that the nozzle 4$^a$ has a central discharge opening 4' and two smaller openings 4$^2$ at each side of said opening 4' all the holes lying in line, in this instance. Also it is noted in Fig. 2$^a$ that the nozzle 5$^a$ has a central opening 5' and two smaller openings 5$^2$, while in Fig. 2$^b$ the nozzle 6$^a$ has a central opening 6' and two smaller openings 6$^2$. In each of the three nozzles, in this particular instance, only, and as shown in the drawings, the lines of holes lie perpendicular to the plane of rotation of the arms.

In Figs. 2$^d$ and 2$^e$ is shown an extremity of two of the sprinkler arms and their nozzles. A so called plug is shown in the bore of each arm. That is to say, in the first of the two figures named a plug 29 snugly fits in the bore of the arm 5 and has a bore 30 in alignment with the central hole 5' said plug being spaced some considerable distance from the nozzle 5$^a$. In Fig. 2$^e$ the arm 6 is furnished with a plug 31 which has a bore 32 in alignment with the nozzle opening 6', but as contrasted to the position of the plug 29 of the arm 5 this plug is located in quite close proximity to the nozzle 6$^a$.

In operation, the delivery of water is partly through the central openings or holes 4', 5' 6' of the nozzles and partly through the openings 4$^2$, 5$^2$, and 6$^2$ thereof for a thorough coverage by water of a given area distant from the sprinkler, assisted by the nozzle opening 28 at the top of the same for the area nearest said sprinkler. Without some type of controlling means the sprinkler arms would cast their water streams to describe a circular area. In order that areas having straight lines only, as their boundaries, the herein described head arrangement is provided. In Fig. 10 it is observed that while there are three arms and thus but three outlets for water discharge, the standard 2, or rather its member 22, has four openings or ports. This being true, it is clear that as in the figure named a full flow of water from the member 22 through an opening 23 may pass directly across the space 26 into the arm 6. At this position of the two members 3 and 22 the other openings 23 open more or less, only, toward the other arms 4 and 5 and discharge water partly thereinto and partly into the annular space 26. When an arm is in register with an opening 23 the issuing water-stream will reach to and define a corner of a square area being sprinkled since a full and free flow of water is permitted. In controlling the water flow between any two corners of a square area it is necessary to gradually reduce the flow to a lowest point so that at the middle distance between any two corners of a square area the pressure will be least, this being followed by permitting a gradually increasing pressure as a sprinkler-arm approaches a position where the water stream again defines a corner of the sprinkled area. For this reason a spacing apart of the member 22 and the member 3 is resorted to together with the proper spacing of the openings 23 and their relation in number to the number of sprinkler arms, so that, as will be clear in viewing Fig. 10, each arm in its swing will gradually receive water flow, which flow will then increase to a full flow followed by a decreasing flow in accordance with the required defining of area boundaries. Naturally, since the bores of the arms are first exposed to the openings 23 for a full flow of water and then exposed to the blind portions of the wall of the member 22, between its said openings, a rise and fall of pressure or flow will result. For this reason the openings or ports 24 of the said member 22 are provided in order that the pressure of water from the standard 2 may equalize to the proper degree the movement of water throughout.

Discharge of water under pressure from the sprinkler arms via discharge apertures 4$^1$, 5$^1$, and 6$^1$ causes the arms and head to rotate, by reaction, in a manner well known to those skilled in the art. Such action is of course assisted by the discharge from the auxiliary apertures 4$^2$, 5$^2$ and 6$^2$. Since the auxiliary apertures 5$^2$ and 6$^2$ of the nozzles 5$^a$ and 6$^a$, respectively, provide discharge streams which diverge from the streams discharged by apertures 5$^1$ and 6$^1$, respectively, it will be seen that rotation of the nozzles 5$^a$ and 6$^a$ on their respective arms in a clockwise direction (viewing the faces of the nozzles) will increase the reaction forces tending to rotate the sprinkler head, such increase being maximum when the nozzles are rotated 90° from the positions shown in Figs. 2$^a$ and 2$^b$. Rotary adjustment of the nozzles 5$^a$ and 6$^a$ in the opposite direction will decrease the reaction forces tending to rotate the sprinkler head. Accordingly, the rate of rotation of the sprinkler may be increased or decreased by rotary adjustment of either or both of the nozzles 5$^a$ and 6$^a$, to the end that the sprinkled area may be either lightly or heavily watered.

Setting the dial 19 at any given number thereon at once sets the valve 14, 15 for a volume of water flow that will sprinkle an area corresponding in measurement to the value of a dial number. Thus the person preparing for the sprinkling operation may, after orienting the sprinkler, as well as having determined the size of the area to be treated, set the dial for the proper pressure for such area.

It is clear that whereas the upper part of the sprinkler constitutes the means for setting the particular pattern of an area to be sprinkled, the valving arrangement in the base provides for the dialed choice of the extent, or spread, of area coverage.

The valve extension or tongue 15 during its adjustment moves across the opening or port 11. In one of its positions, shown in broken lines in Fig. 6, its edge 15' lies crosswise of the port at its widest measurement including the communicating recesses 13. The exposed area of the port is that which permits a minimum flow of water for covering an area of the least spread, this corresponding to the lowest dial setting. As the valve is rotated more and more in the proper direction, the port is increasingly exposed for larger and larger areas.

Earlier herein attention was called to the gradual increase in spread of the port as to its lateral measurement. It is believed to be clear that a port having a uniform spread throughout its width would require a valve of considerable bulk as compared with a valve whose port varies in width throughout as herein. In the present instant, the valve would require less movement in exposing an opening for passage of given bulk of water. Herein the movement of the dial from "20" to "30," for example, would involve but little movement of the valve due to the increasing lateral spread of the port as compared with an opening or port of uniform width.

Particular attention is drawn to the positions of and purpose of the plugs 29 and 31 previously described. Whereas the plug 31 of the arm 6 has a position close to the nozzle opening 6' so that a full or unbroken stream is positively thrown from the latter to reach the extreme edge of the area sprinkled, the stream issuing from the opening 30 of the plug 29 will be broken up and become a spray before reaching the opening 5' of the nozzle 5$^a$. Thus, the stream flowing in the arm 5 is broken up and issues from the nozzle 5$^a$ as a finer spray which is concentrated, as the sprinkler rotates, within limits smaller than the total ground area determined by adjustment of the dial 19 and its associated valve.

I claim:

1. A lawn sprinkler of the rotary arm type including in its construction a standard for conducting water under pressure, a member rotatably mounted thereon including a series of tubular arms for receiving water from said standard, a nozzle terminating the free end of each arm and each having an opening for discharge of water, means in control of water flow to said arms including a diaphragm having an opening therethrough, a valve member in control of the opening, said opening varying uniformly in width of spread from one limit to another thereof in a direction paralleling the plane of movement of the said valve, and a dial for control of the valve, the same having indicia thereon denoting spreads of ground areas to be sprinkled.

2. A lawn sprinkler of the rotary arm type including in its construction a standard for conducting water under pressure, a member rotatably mounted on the standard to receive water therefrom, a series of tubular arms carried by the member, a nozzle terminating the free extremity of each arm and each having a longitudinal discharge opening, a member lying in the bore of one of the arms in close proximity to the nozzle of that arm and having an opening therethrough whose axis coincides with the axis of the opening of the nozzle of that arm, a member lying in the bore of a second arm of the series of arms, the same being widely spaced from the nozzle of that arm and having an opening therethrough whose axis coincides with the axis of the opening of said nozzle, adjustable means in control of the water flow to said arms including a movable valve member and a diaphragm cooperating with said valve member and having an opening varying uniformly in width of spread from one limit to another limit thereof in a direction paralleling the plane of movement of the valve member, and a dial in control of the latter having indicia thereon denoting spreads of ground areas to be sprinkled.

3. A lawn sprinkler of the rotary arm type including in its construction a standard for conducting water under pressure, a member rotatably mounted on the standard and having a cavity therein, a series of tubular arm carried by said member to receive water from said cavity thereof supplied thereto from said standard, a discharge nozzle terminating the free end of each arm, means in control of the water flow to said arms including a diaphragm having an opening therethrough, a valve member in control of the opening, said opening varying in width of spread from one limit to another thereof in a direction paralleling the plane of movement of the said valve member, and a dial in control of the valve member having indicia thereon denoting spreads of ground areas to be sprinkled.

4. A lawn sprinkler of the whirling arm type including in its construction a standard for conducting water under pressure, a member rotatable mounted on the standard and having a cavity therein, a series of tubular arms carried by the member to receive water from said cavity supplied thereto from said standard, a nozzle terminating the free extremity of each arm and each having a central discharge opening, a member lying in the bore of a second arm of the series of arms, the same lying in spaced relation to the nozzle of that arm and having an opening therethrough whose axis coincides with the axis of the said opening of the nozzle of that arm, means in control of the water flow to said arms including a diaphragm having an opening therethrough, a valve member in control of said opening, said opening varying uniformly in width of spread from one limit to another thereof in a direction paralleling the plane of movement of said valve member, and a dial for control of the valve member having characters thereof denoting spreads of ground areas to be sprinkled.

5. In a rotary lawn sprinkler for sprinkling polygonal ground areas, the combination of a standard for conducting water under pressure, said standard terminating at its upper end in a tubular member axially aligned therewith; a head member rotatably supported by said standard and enclosing said tubular member; there being a closed annular space between said head member and said tubular member; said tubular member being provided with two axially spaced sets of radially extending ports allowing passage of water under pressure from said standard into said annular space, the ports of one of said sets equalling in number the corners of the polygonal area to be sprinkled and being larger in diameter than the ports of the other of said sets; a series of radially disposed tubular sprinkler arms carried by said head member and opening into said annular space to receive water therefrom, the axes of said arms and said one set of ports lying substantially in the same plane, whereby each of said arms receives a substantially direct discharge of water from each port of said one set once during each rotation of the head member, said other set of ports serving to minimize pressure variations in said annular space; and adjustable valve means in control of the water flow to said arms.

6. In a rotary lawn sprinkler, the combination of a standard for conducting water under pressure, a member rotatably mounted on said standard and carrying a plurality of radially arranged tubular arms disposed to receive water from said standard, a plurality of discharge nozzles arranged one at the free end of each of said arms, each nozzle including two longitudinal discharge openings disposed with their axes at an angle to each other, adjustable means in control of the flow of water to said arms and including a movable valve member cooperating with a diaphragm having an opening varying uniformly in width of spread from one limit to another thereof in a direction paralleling the plane of movement of said valve member, and means for moving said valve member, said means including a scale bearing indicia denoting spreads of ground areas to be sprinkled.

7. In a rotary lawn sprinkler of the reaction type the combination of a standard for conducting water under pressure, a sprinkler head rotatably mounted on said standard and including a plurality of radially disposed arms arranged to receive water therefrom, a nozzle on each of said arms and each having a discharge opening disposed with its axis parallel to the axis of the arm carrying it, certain of said nozzles each having a second discharge opening disposed with its axis at an angle to the axis of the first mentioned discharge opening, said last mentioned nozzles being mounted for rotation upon the arms carrying them, whereby water discharged from said second discharge openings of said last mentioned nozzles may be directed to one side of the arms carrying such nozzles and thus cause a force of reaction tending to rotate the sprinkler head at a rate dependent upon the extent of rotation of said last mentioned nozzles, adjustable means in control of the water flow to said arms including a movable valve member cooperating with diaphragm having an opening varying uniformly in width in a direction paralleling the movement of said valve member, and means for adjusting said valve member.

8. In a rotary lawn sprinkler of the type described comprising a sprinkler head, means rotatably supporting said head and constructed to supply water under pressure thereto, and a plurality of similar disposed radially extending tubular sprinkler arms of substantially equal length carried by said head and arranged to receive water therefrom, each of said arms terminating in an apertured discharge nozzle, the combination of adjustable valve means disposed in said sprinkler to control the total flow of water to said head and thus determine the extent of the ground area to be sprinkled, and a fixed hydraulic restrictor disposed within one of said arms and spaced from the discharge nozzle thereof, the bore of said one arm between said restrictor and nozzle being substantially uninterrupted, and the space between said restrictor and said nozzle being sufficiently great that the flow of water from said restrictor is broken within the bore of said one arm before reaching said nozzle, whereby the discharge from the nozzle of said one arm is concentrated within an area smaller than the total ground area determined by said valve means.

9. In a rotary lawn sprinkler of the type comprising a sprinkler head, means rotatably supporting said head and constructed to supply water under pressure thereto and a plurality of radially extending tubular sprinkler arms carried by said head and arranged to receive water therefrom, each of said arms terminating in an apertured discharge nozzle, the combination of adjustable valve means disposed in said sprinkler to control the total flow of water to said head and thus determine the extent of the ground area to be sprinkled, and two hydraulic restrictors disposed each within a different one of said arms, the spacings of said restrictors from the outer ends of their respective arms being unequal so that said restrictors constitute fixed flow control means to concentrate the discharges from their respective arms in different portions of the ground area determined by said valve means.

References Cited in the file of this patent

UNITED STATES PATENTS

| | | |
|---|---|---|
| 436,592 | Baker et al. | Sept. 16, 1890 |
| 1,239,373 | Farmer et al. | Sept. 4, 1917 |
| 1,434,625 | Olsen | Nov. 7, 1922 |
| 1,697,203 | Nelson | Jan. 1, 1929 |
| 1,745,005 | Buckner | Jan. 28, 1930 |
| 1,775,162 | Fisk et al. | Sept. 9, 1930 |
| 1,882,546 | Brossman | Oct. 11, 1932 |
| 1,976,030 | Lighthall | Oct. 9, 1934 |
| 2,032,369 | Kilpatrick | Mar. 3, 1936 |
| 2,101,356 | Zak | Dec. 7, 1937 |
| 2,110,112 | Rippey | Mar. 1, 1938 |
| 2,223,441 | Coles | Dec. 3, 1940 |
| 2,335,281 | Jepsen | Nov. 30, 1943 |
| 2,335,332 | Wright | Nov. 30, 1943 |
| 2,381,740 | Grelson | Aug. 7, 1945 |
| 2,554,040 | Long | May 22, 1951 |